(12) United States Patent
Wu et al.

(10) Patent No.: US 11,221,876 B2
(45) Date of Patent: Jan. 11, 2022

(54) SCHEDULING APPLICATIONS IN CPU AND GPU HYBRID ENVIRONMENTS

(71) Applicant: PayPal, Inc., San Jose, CA (US)

(72) Inventors: Yuehao Wu, Cupertino, CA (US); Xin Xu, San Jose, CA (US); Junhua Zhao, San Jose, CA (US); Pengshan Zhang, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/236,546

(22) Filed: Dec. 30, 2018

(65) Prior Publication Data

US 2020/0210228 A1 Jul. 2, 2020

(51) Int. Cl.
*G06F 9/48* (2006.01)
*G06N 3/04* (2006.01)
*G06T 1/20* (2006.01)

(52) U.S. Cl.
CPC ......... *G06F 9/4881* (2013.01); *G06N 3/0454* (2013.01); *G06T 1/20* (2013.01)

(58) Field of Classification Search
None
See application file for complete search history.

(56) References Cited

U.S. PATENT DOCUMENTS

| 8,954,968 | B1* | 2/2015 | Pohl | G06F 11/3404 |
| | | | | 718/100 |
| 2007/0300231 | A1* | 12/2007 | Aguilar | G06F 9/4881 |
| | | | | 718/104 |
| 2008/0155550 | A1* | 6/2008 | Tsafrir | G06F 9/4881 |
| | | | | 718/103 |
| 2010/0241683 | A1* | 9/2010 | Nakanishi | G06F 9/5016 |
| | | | | 708/520 |
| 2012/0096046 | A1* | 4/2012 | Kucera | G06F 16/9535 |
| | | | | 707/802 |
| 2012/0137295 | A1* | 5/2012 | Soetemans | G06F 9/524 |
| | | | | 718/100 |
| 2014/0176583 | A1* | 6/2014 | Abiezzi | G06T 1/20 |
| | | | | 345/522 |

(Continued)

OTHER PUBLICATIONS

Choi, Hong Jun, et al. "An efficient scheduling scheme using estimated execution time for heterogeneous computing systems." The Journal of Supercomputing 65.2 (2013): 886-902 (Year: 2013).*

(Continued)

*Primary Examiner* — Sarah Le
(74) *Attorney, Agent, or Firm* — Haynes and Boone LLP

(57) ABSTRACT

A method may include receiving instructions to process a first application in response to a user request. The method also includes determining whether to store the first application in a first processing queue or a second processing queue based on a comparison between a CPU processing cost associated with the first application and a GPU processing cost associated with the first application. Further, the method includes grouping a first set of applications stored in the first processing queue according to CPU grouping criteria and grouping a second set of applications stored in the second processing queue according to GPU batching criteria. The method also includes causing a CPU to process the grouped first set of applications and a plurality of GPUs to process the grouped second set of applications.

20 Claims, 7 Drawing Sheets

(56) References Cited

U.S. PATENT DOCUMENTS

| | | | |
|---|---|---|---|
| 2014/0208330 A1* | 7/2014 | Pusukuri | G06F 9/4881 |
| | | | 718/104 |
| 2015/0067700 A1* | 3/2015 | Kim | G06F 9/46 |
| | | | 718/107 |
| 2016/0171589 A1* | 6/2016 | Glover | G06Q 30/0631 |
| | | | 705/26.7 |
| 2017/0090999 A1* | 3/2017 | Weber | G06F 9/5033 |
| 2017/0255496 A1* | 9/2017 | Deng | G06F 9/4881 |
| 2019/0087232 A1* | 3/2019 | Bergsma | G06F 9/5038 |
| 2019/0121664 A1* | 4/2019 | Zhao | G06F 9/505 |
| 2019/0318245 A1* | 10/2019 | Song | H04L 29/08 |

OTHER PUBLICATIONS

Gregg, Chris, et al. "Dynamic heterogeneous scheduling decisions using historical runtime data." Workshop on Applications for Multi- and Many-Core Processors (A4MMC). 2011 (Year: 2011).*

Verner, Uri, Assaf Schuster, and Avi Mendelson. Processing Real-time Data Streams on GPU-based Systems. Diss. Computer Science Department, Technion, 2015 (Year: 2015).*

* cited by examiner

SCHEDULING APPLICATIONS IN CPU AND GPU HYBRID ENVIRONMENTS

BACKGROUND

Technical Field

This disclosure relates generally to processor scheduling and, more specifically, to scheduling applications in CPU and GPU hybrid environments.

Description of the Related Art

Computer systems today are leveraging graphics processing units (GPUs) more and more to process computer tasks that were once the sole province of central processing units (CPUs). In particular, GPUs may be used to process computer tasks that benefit from the parallel processing capabilities of GPUs. Still, many computer tasks remain more efficiently processed by CPUs. Thus, in computing environments that use both CPUs and GPUs to process different applications, a smart way to schedule the applications for processing on the CPUs and/or GPUs may help save computing resources.

Figure 1:
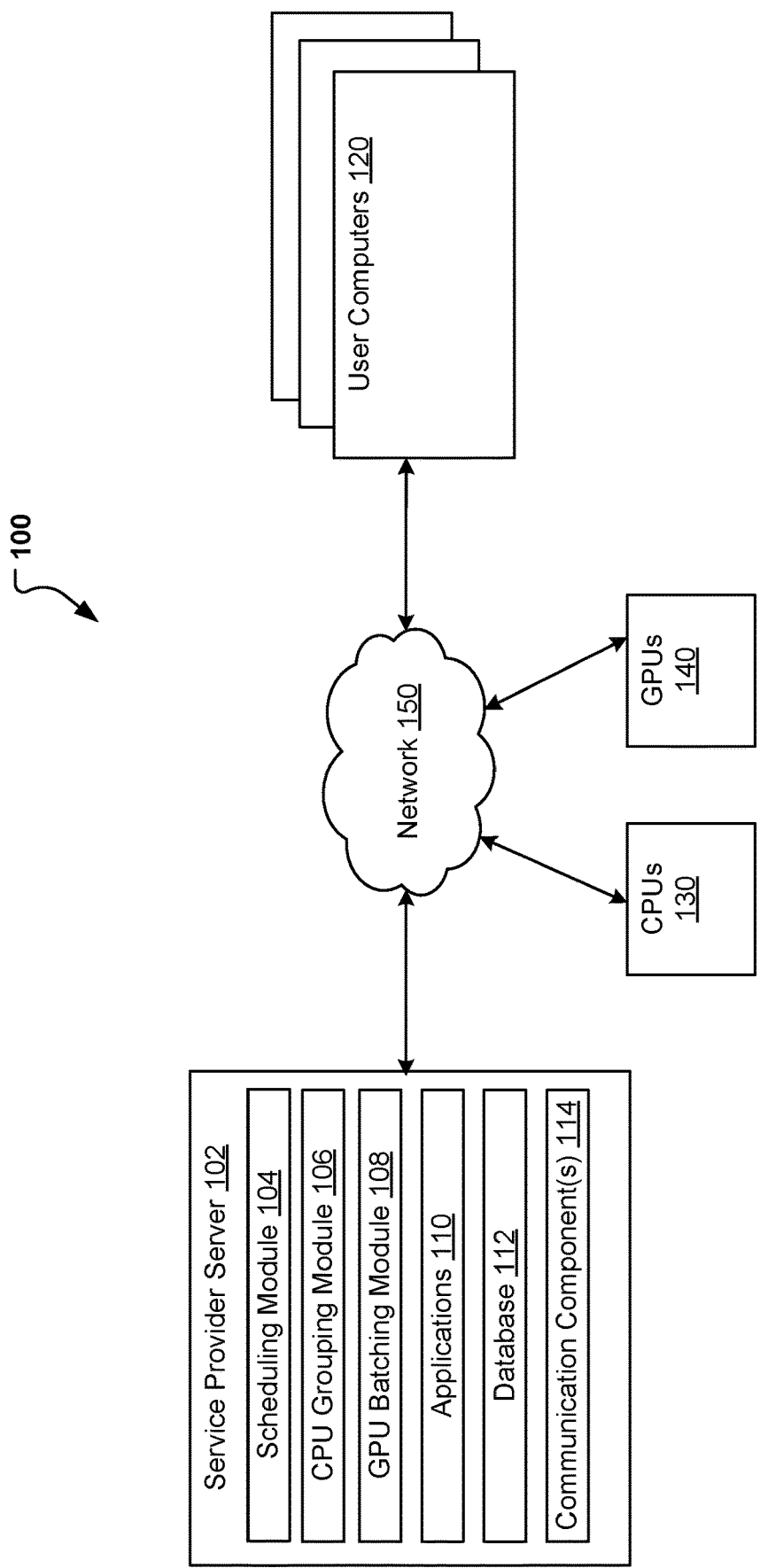
FIG. 1 is a block diagram illustrating an example system for scheduling applications in a CPU and GPU hybrid environment, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "CPU grouping module . . . configured to group" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, central processing units (CPUs), graphics processing units (GPUs), programmable hardware devices such as a field programmable gate array (FPGA), and/or larger portions of systems that include multiple processors, as well as any combinations thereof.

DETAILED DESCRIPTION

Techniques are disclosed for scheduling application execution in CPU and GPU hybrid environments. In certain embodiments, a service provider server may a request, such as from a user computer, to perform a digital transaction. Based on the request, the service provider server may be configured to execute one or more server-side computer applications to service the request. For instance, the request may correspond to a payment transaction request, and the computer application may be a computer risk application that is executed using information in the transaction request. The computer risk application outputs one or more scores that indicate a risk level of the payment transaction.

The service provider may have access to a set of applications from which to select in response to user requests. Each application from the set of applications may be associated with a respective application identifier. Further, the service provider server may receive numerous user requests from various user computers. For each user request, the service provider server may select one or more applications from the set of applications that are appropriate for processing the user request. Additionally, the service provider server may use the same application for different requests, but with different input values to the application depending on the request. For instance, the service provider serve may receive a first request and a second request and determine that a application associated with a first application identifier is to be used to process both requests. However, the first request may include a first set of input values for the computer application, while the second request may include a second set of input values to provide to the computer application. The first set of input values may be different from the second set of input values. As a result, the respective outputs from the application in response to the first request and the second request may be different.

According to a particular embodiment, the service provider server may operate in a CPU and GPU hybrid environment. As such, the service provider server may determine whether certain applications are to be processed by a set of CPUs and/or a set of GPUs. However, different applications may be associated with different CPU processing costs and different GPU processing costs. Thus, being able to efficiently schedule an application for processing by a CPU or GPU may save valuable computing resources and improve throughput and latency.

As such, the service provider server may include a scheduling module configured to determine whether certain applications are to be processed by CPUs or GPUs. Generally, for a particular application, the scheduling module is configured to determine a CPU processing cost and GPU processing cost for the particular application. If the CPU processing cost is less than or equal to the GPU processing cost, the scheduling module assigns and/or stores the particular application in a CPU processing queue. Otherwise, the scheduling module stores the particular application in a GPU processing queue. It is understood that "storing an application" in a processing queue does not necessarily mean that the application itself is stored in the processing queue. Rather, the application identifier associated with the application and the input values for the application may be stored in the processing queue.

The CPU processing queue may store multiple applications that are to be processed by the CPUs. The service provider server may include a CPU grouping module that is configured to group the applications in the CPU processing queue into one or more task groups. The grouping is performed according to CPU grouping criteria. In a particular embodiment, the CPU grouping module groups the applications such that the total processing cost for each task group are within a predetermined threshold range of each other. That is, the CPU grouping module distributes the CPU processing costs of the applications as evenly as possible among different task groups. The number of task groups may be determined based on a number of threads that are available to process the task groups. Each task group is then provided to the CPUs for processing. In some implementations, each task groups is processed by a different CPU core.

The GPU processing queue may store multiple applications that are to be processed by the GPUs. The service provider server may include a GPU batching module that is configured to group the applications stored in the GPU processing queue into one or more GPU batches. The GPU processing queue may be associated with a maximum number of applications that can be stored in the queue. Further, each of the applications may be associated with an elapsed time indication that indicates an amount of the time the application has been waiting in the GPU processing queue. If the number of applications stored in the GPU processing queue reaches the maximum number, or the elapsed time indication of any of the applications reach a time threshold, the GPU batching module is configured to perform batching operations with respect to the applications stored in the GPU processing queue.

As part of the batching operations, the GPU batching module may group applications having the same application identifier into respective batches. In other words, each batch may include only applications of a respective application identifier. For example, each application included in a first batch may be associated with a first application identifier, and each application in a second batch may be associated with a second application identifier that is different from the first application identifier.

According to a particular embodiment, each of batches generated by the GPU batching module may be processed by a different GPU from a set of GPUs. Since each batch includes applications of the same application identifier, the parallel processing capabilities of the GPU can be effectively leveraged, and mass calculations can be performed simultaneously for applications that service different user requests.

FIG. 1 is a block diagram illustrating an example system 100 for scheduling applications in CPU and GPU hybrid environments. In the illustrated embodiment, the system 100 includes a service provider server 102 of a service provider in communication with user computers 120 via a network 150. The service provider server 102 may facilitate a variety of services provided to user of the user computers 120 including, but not limited to, social networking services, media services, communication services, payment transaction services, and/or the like.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, the service provider server 102 may include a scheduling module 104, a CPU grouping module 106, a GPU batching module 108, a set of applications 110, a database 112, and communication components 114. The service provider may be configured to receive user requests from the user computers 120. Further, for each of the user requests, the service provider server 102 identifies one or more applications from the set of applications 110 to process information in the user request. More particularly, the identified applications and the information included in the user request are processed by either CPUs 130 or GPUs 140 in response to the user request. Additionally, each of the applications 110 is associated with a respective application identifier.

In certain embodiments, the service provider provides the identified applications 110 (e.g., the instructions for executing the applications) to the CPUs 130 and/or GPUs 140 via network 150. In other embodiments, the CPUs 130 and/or the GPUs 140 may be included in the service provider server 102. In yet other embodiments, the CPUs 130 and/or the GPUs 140 may be in communication with the service provider server 102 on a private network that is separate from the network 150 and that is inaccessible by the user computers 120.

The scheduling module 104 is configured to determine whether store each identified application 110 in a CPU processing queue or a GPU processing queue. The scheduling module 104 may base this determination on respective CPU processing costs and GPU processing costs for each identified application 110. As used herein "processing cost" may refer to various measurements related to the consumption of processor resources, such as an amount of processing time for a processor, a number of processing cycles for the processor, and/or the like.

For example, for a particular application, if its CPU processing cost is less than or equal to its GPU processing cost, the scheduling module 104 may be configured to store the particular application in the CPU processing queue. Otherwise, if the GPU processing cost is less than the CPU processing cost, the scheduling module 104 may be configured to store the particular application in the GPU processing queue. Further, as previously mentioned, "storing an application" in a processing queue does not necessarily mean that the application itself is stored in the processing queue. Rather, the application identifier associated with the application and the input values for the application may be stored in the processing queue. In addition, the input values for application may be derived from information included in the corresponding user request. For example, the user request may include an account identifier, and the input values for the application may be determined based on accessing a database (e.g., database 112) to obtain account information associated with the account identifier. In some embodiments, the input values are stored as a matrix of float values.

In some embodiments, prior to comparing the CPU processing cost and the GPU processing cost for the particular application, the scheduling module 104 may determine whether a current utilization rate for the CPUs 130 is below a utilization threshold. If so, the scheduling module 104 may perform the determination of which processing queue to store the particular application as described above (e.g., comparing the CPU processing cost and the GPU processing cost). Otherwise, if the current utilization rate is equal to or above the utilization threshold, the scheduling module 104 assigns the particular application to the GPU processing queue.

The CPU grouping module 106 may be configured to group the applications stored in the CPU processing queue into one or more task groups according to CPU grouping criteria. For instance, the CPU grouping criteria may specify that the difference between respective total processing costs of any two task groups is less than a predetermined value, where a respective total processing cost of a particular task group is equal to the sum of respective CPU processing costs of each application included in the task group. Thus, grouping the applications stored in the CPU processing queue according to this CPU grouping criteria may result in task groups in which the respective processing costs of the applications included in the task groups are relatively evenly distributed. It will be appreciated that the CPU grouping criteria is not limited to the example described above, and that various other criteria may also be applied by the CPU grouping module 106.

Similarly, the GPU batching module 108 may be configured to group the applications stored in the GPU processing queue in to one or more GPU batches according to GPU batching criteria. For example, the GPU processing queue may be associated with a maximum storage capacity (e.g., a maximum number of applications that can be stored in the GPU processing queue). As such, a first criteria of the GPU batching criteria may be satisfied if the GPU batching module 108 determines that the number of applications currently stored in the GPU processing queue has reached the maximum storage capacity.

As another example, each of the applications stored in the GPU processing queue may be associated with a respective elapsed time indication. A respective elapsed time indication associated with a particular application may represent an amount of time that has elapsed since a reference point in time. The reference point in time may be any point in time including, but not limited to, the time at which the particular application was stored in the GPU processing queue, the time at which the user request corresponding to the particular application was received by the server provider server 102, and/or the like. As such, a second criteria of the GPU criteria may be satisfied if the GPU batching module 108 determines that a respective elapsed time indication of any of the applications stored in the GPU processing queue is greater than or equal to an elapsed time threshold.

According to some embodiments, the GPU batching module 108 groups the applications of the GPU processing queue into the one or more GPU batches if either of the first criteria or the second criteria is satisfied. To this end, the one or more GPU batches generated by the GPU batching module 108 also satisfy a third criteria of the GPU batching criteria. To this end, each GPU batch of the one or more GPU batches includes only applications of the same application identifier, and different GPU batches include applications having different application identifiers.

For example, the GPU batching module 108 may generate a set of GPU batches from the applications included in the GPU processing queue. The set of GPU batches may include a first GPU batch in which each application included in the first GPU batch is associated with a first application identifier. The set of GPU batches may include a second GPU batch in which each application included in the second GPU batch is associated with a second application identifier that is different than the first application identifier.

The applications 110 may be stored in a storage device accessible by the service provider server 102. As previously discussed, the service provider server 102 may identify certain applications from application 110 to run in order to service user requests from user computer 120. In certain embodiments, the user requests correspond to transaction requests (e.g., media transactions, social media transactions, payment transactions, and/or the like), and the applications 110 correspond to neural network models that output scores that indicate a risk level of processing those transaction requests. It will be appreciated that any other types of computer models and applications are also contemplated by the present disclosure as being possible applications of applications 110.

The database 112 stores various information used to implement the techniques described herein. In certain embodiments, the database 112 may store respective CPU processing costs and respective GPU processing costs for each application 110. For instance, as previously discussed, each application 110 may be associated with an application identifier. As such, for each application identifier, the database 112 stores an association between the application identifier, a respective CPU processing cost, and a respective GPU processing cost.

The communication component 114 may be configured to communicate with various other devices, such as the user computer 120 and/or other devices. In various embodiments, communication component 114 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
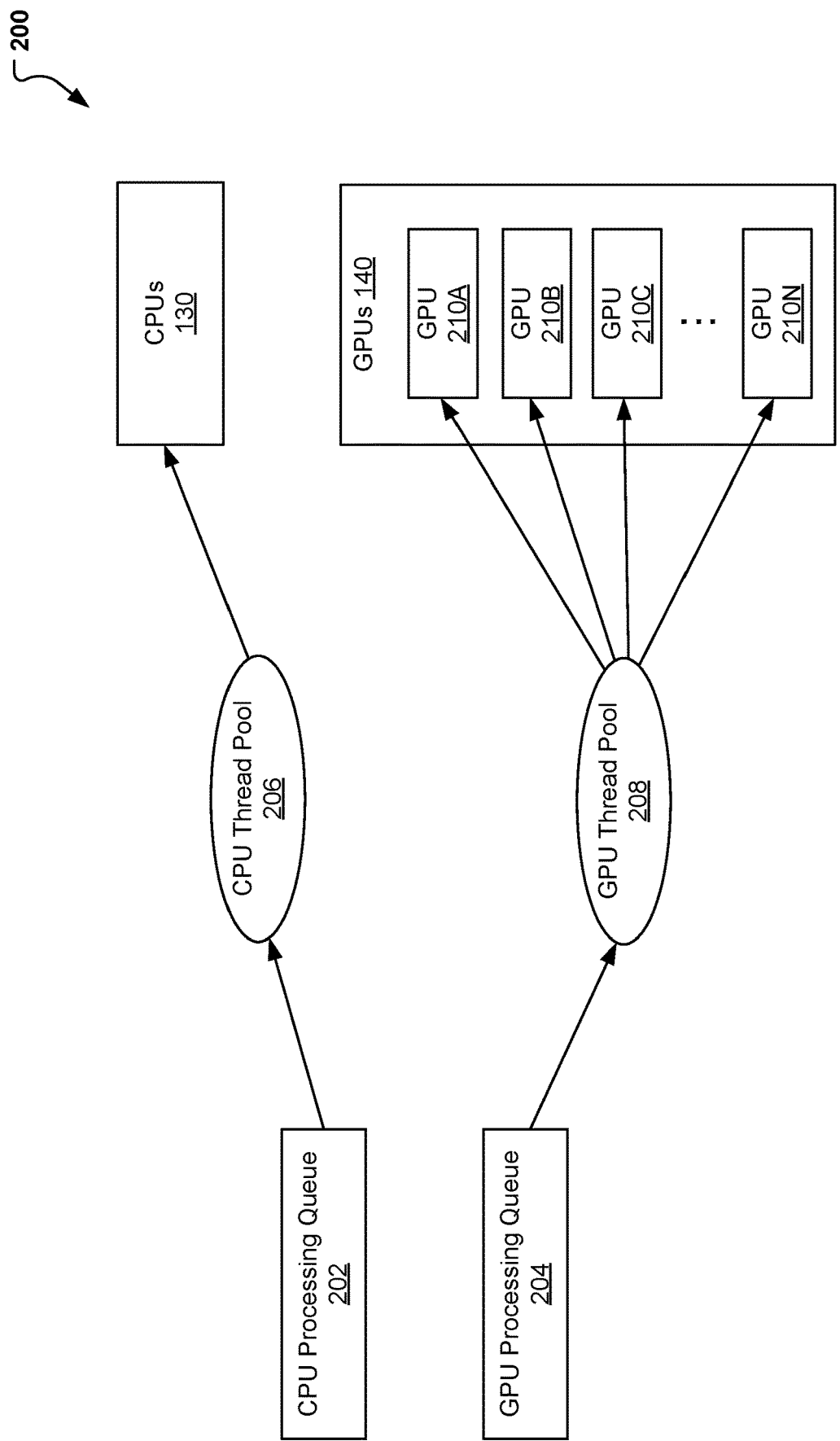
FIG. 2 illustrates a block diagram illustrating an example framework for pulling applications from processing queues to be processed by CPUs and/or GPUs, according to some embodiments.

FIG. 2 illustrates an example block diagram that depicts a framework 200 by which applications are pulled from processing queues to be processed by CPUs and/or GPUs. As such, the framework 200 includes a CPU processing queue 202, a GPU processing queue 204, a CPU thread pool 206, a GPU thread pool 208, CPUs 130, and GPUs 140. GPUs 140 include one or more GPUs, including GPUs 210A-N. According to certain embodiments, the CPU processing queue 202, GPU processing queue 204, CPU thread pool 206, and GPU thread pool 208 may be included in the service provider server 102, in a device that is separate from the service provider server 102, or in any combination thereof.

Generally, threads from the CPU thread pool 206 are configured to pull applications from the CPU processing queue 202 and provide the pulled applications to the CPUs 130 to be processed. The number of threads included in the CPU thread pool 206 may be based on the number of CPUs included in CPUs 130. More particularly, in certain embodiments, the number of threads included in the CPU thread pool 206 is based on the number of total CPU processing cores included in CPUs 130. In a particular embodiment, the number of threads included in the CPU thread pool 206 is twice the number of total CPU processing cores.

As previously discussed, the applications included in the CPU processing queue 202 may be grouped (by the CPU grouping module 106) into one or more task groups. To this end, each task group is pulled by a respective thread of the CPU thread pool 206 and provided to one of the CPUs 130 (e.g., a processing core of the CPUs 130) for processing. Different task groups may be pulled by different threads from the CPU thread pool 206.

Similarly, threads from the GPU thread pool 208 are configured to pull applications from the GPU processing queue 204 and provide the pulled applications to the GPUs 140 to be processed. The number of threads included in the GPU thread pool 208 may be based on the number of GPUs 210A-N included in GPUs 140. In a particular embodiment, the number threads included in the GPU thread pool 208 is equal to the number of GPUs 210A-N included in GPUs 140.

As previously discussed, the applications included in the GPU processing queue 204 may be grouped (by the GPU batching module 108) into one or more GPU batches. As such, each GPU batch may be pulled by a respective thread of the GPU thread pool 208 and transmitted to a particular GPU 210A-N for processing. For example, a first thread from the GPU thread pool 208 may pull a first batch from the GPU processing queue 204 and transmit the first batch to GPU 210A for processing. A second thread from the GPU thread pool 208 may pull a second batch from the GPU processing queue 204 and transmit the second batch to GPU 210C for processing.

Figure 3A:
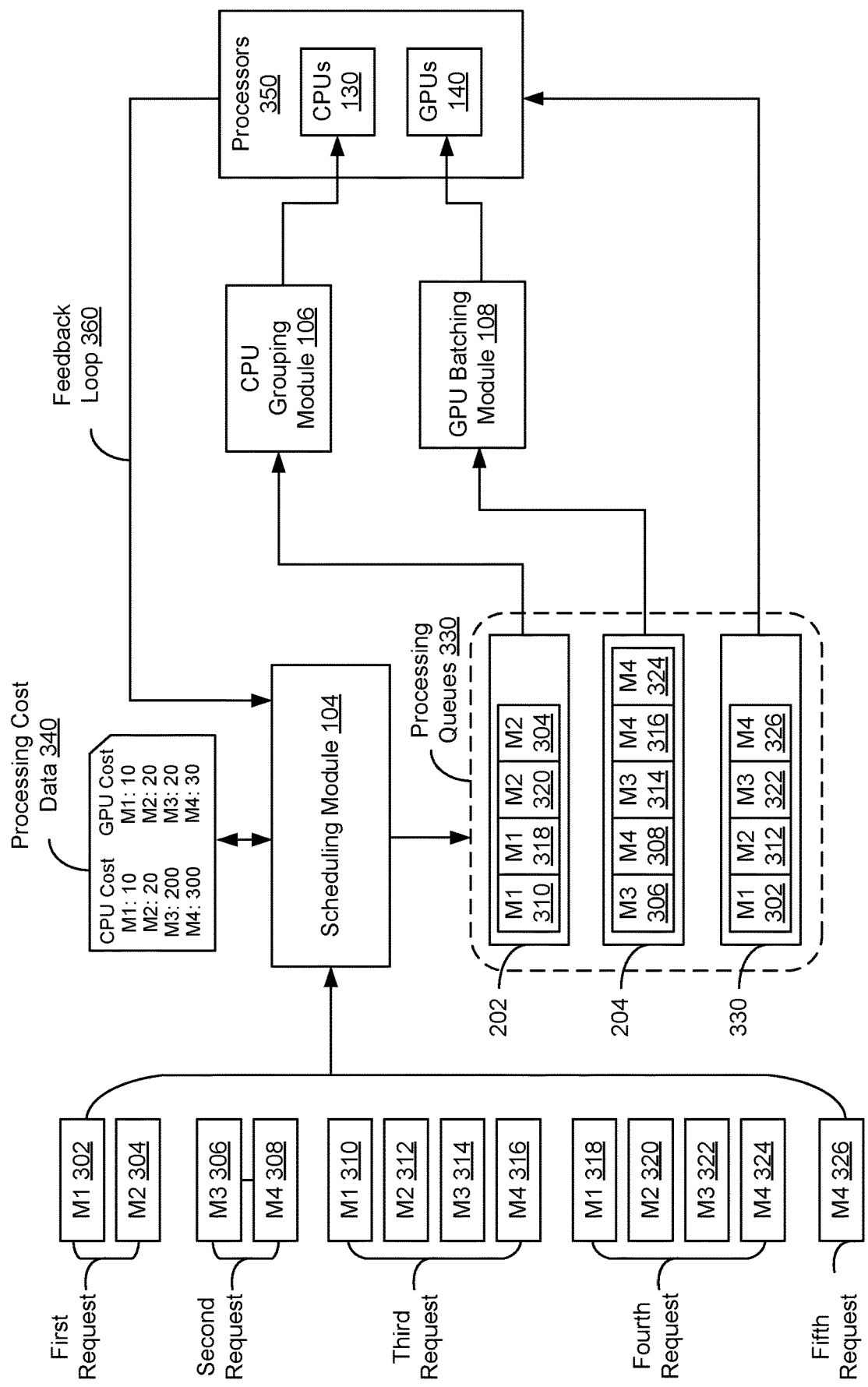
FIG. 3A illustrates a diagram illustrating an example scenario for scheduling applications in a CPU and GPU hybrid environment, according to some embodiments.

FIG. 3A illustrates a diagram of an example scenario for scheduling applications in a CPU and GPU hybrid environment. As illustrated in FIG. 3A, the scheduling module 104 may configured to receive requests to execute applications included in a first request, a second request, a third request, and fourth request, and a fifth request. The first request may be associated with applications M1 302 and M2 304. As depicted in FIG. 3A, "M1", "M2", "M3", and "M4" represent respective application identifiers for different applications. The second request may be associated with applications M3 306 and M4 308. The third request may be associated with applications M1 310, M2 312, M3 314, and M4 316. The fourth request may be associated with applications M1 318, M2 320, M3 322, and M4 324. The fifth request may be associated with applications M4 326.

FIG. 3A also depicts processing cost data 340. Processing cost data stores respective CPU processing costs and GPU processing costs for each application M1-M4. As previous discussed, the processing costs shown may represent processing times, processing cycles, and/or any other metrics for measuring resource consumption by the CPUs 130 and GPUs 140. It will be appreciated that the numbers shown by processing cost data 340 are merely examples and that other situations will can have different numbers.

Based on the processing data 340, the scheduling module 104 stores the respective applications 302-326 of the requests in processing queues 330. Processing queues 330 include the CPU processing queue 202, the GPU processing queue 204, and a control queue 330. As depicted in FIG. 3A, the CPU processing queue 202 stores applications M1 310, M1 318, M2 320, and M2 304. This is consistent with the operations of the schedule module 104 as previously discussed, since for both applications M1 and M2, their respective CPU processing costs are equal to their respective GPU processing costs. The CPU processing queue 202 is accessed by the CPU grouping module 106, and the applications stored in the CPU processing queue 202 are grouped accordingly, as described in further detail with respect to FIG. 3B below. The grouped applications from the CPU processing queue 202 are then transmitted to the CPUs 130 for processing.

The GPU processing queue 204 stores applications M3 306, M4 308, M3 314, M4 316, and M4 324. Again, this is consistent with the operations of the schedule module 104 as previously discussed, since the respective GPU processing costs for applications M3 and M4 are less than their respective CPU processing costs. The GPU processing queue 204 is accessed by the GPU batching module 108, and the applications stored in the GPU processing queue 204 are batched accordingly, as described in further detail with respect to FIG. 3B below. The batched applications from the GPU processing queue 204 are then transmitted to the GPUs 140 for processing.

FIG. 3A also depicts a feedback loop 360 from the processors 350 back to the scheduling module 104. The feedback loop 360 may include information related to the actual processing costs of processing applications 302-326. Based on this information, the scheduling module 104 may be configured to adjust one or more of the CPU processing costs and/or GPU processing costs stored by the processing cost data 340.

According to certain embodiments, the scheduling module 104 may also be configured to assign certain applications from the requests (e.g., the first, second, third, fourth, and fifth requests) to the control queue 330. In certain embodiments, the scheduling module 104 may randomly select applications from applications 302-326 to be stored in the control queue 330. Applications in the control queue 330 that would normally be stored in the CPU processing queue 202 may instead be transmitted to the GPUs 140 for processing. Conversely, applications in the control queue 330 that would normally be stored in the GPU processing queue 204 may instead be transmitted to the CPUs 130 for processing. Their actual processing times with respect to the CPUs 130 and/or the GPUs 140 are transmitted back to the scheduling module 104 via the feedback loop 360. Accordingly, the scheduling module 104 updates the processing cost data 340 based on the actual processing times.

For example, as shown in FIG. 3A, the control queue 330 stores applications M1 302, M2 312, M3 322, and M4 326. Applications M1 302 and M2 may normally be stored in the CPU processing queue 202, and applications M3 322 and M4 326 may normally be stored by the scheduling module 104 in the GPU processing queue 204. Thus, applications M1 302 and M2 312 may be transmitted to the CPUs 130 for processing while applications M3 322 and M4 326 may be transmitted to the GPUs 140 for processing. As a result, any changes to the respective GPU processing costs for applications M1 302 and M2 312 can be detected and transmitted back to the scheduling module 104 via the feedback loop 360. Similarly, any changes to the respective CPU processing costs for applications M3 322 and M4 326 can be detected and transmitted back to the scheduling module 104 via the feedback loop 360.

Figure 3B:
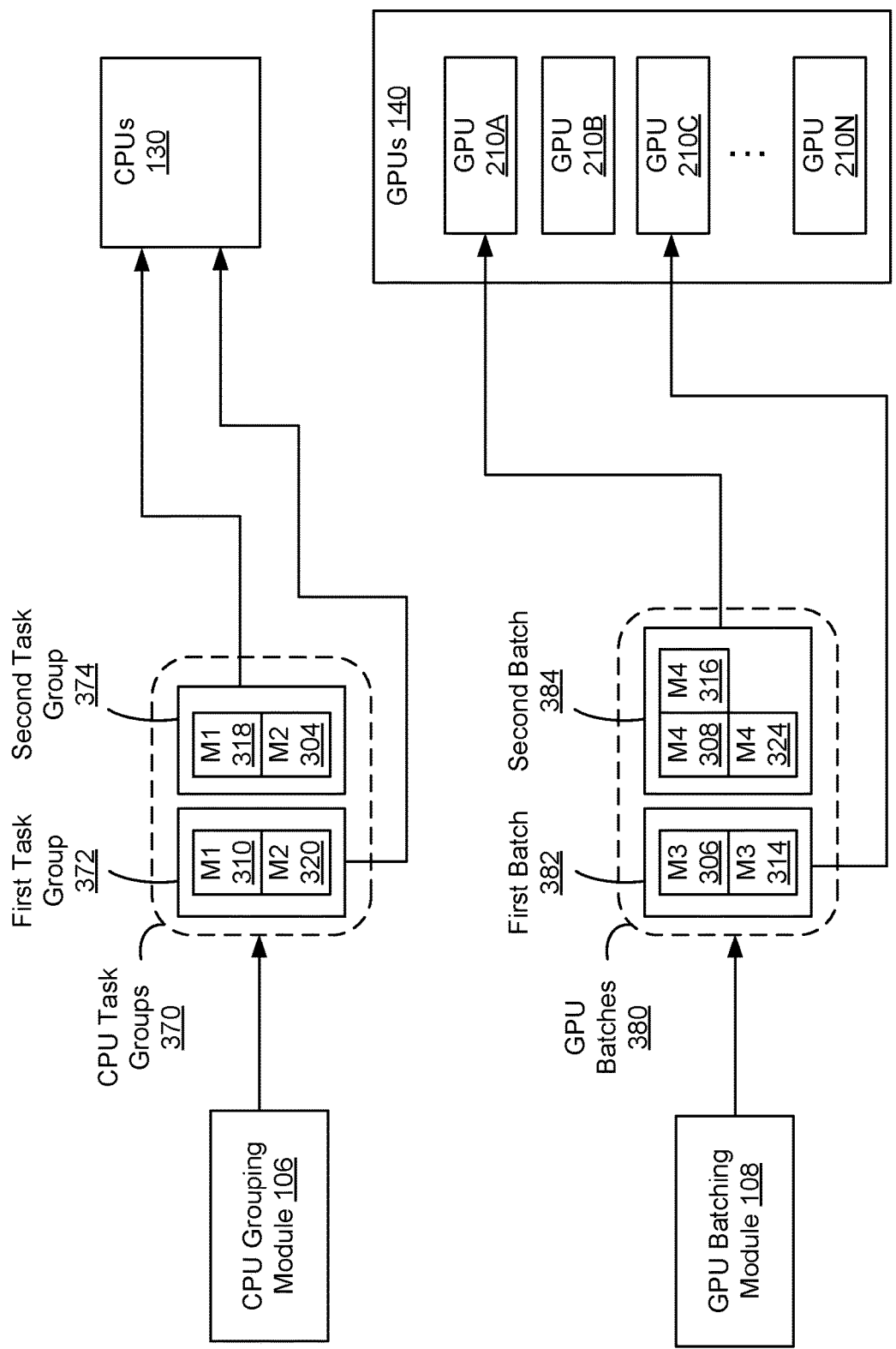
FIG. 3B is a flow diagram illustrating CPU grouping and GPU batching of the applications depicted in FIG. 3A, according to some embodiments.

FIG. 3B illustrates a diagram that depicts CPU grouping and GPU batching of the applications depicted in FIG. 3A, according to one or more particular embodiments. As shown in FIG. 3B, the CPU grouping module 106 groups the applications stored in the CPU processing queue 202 into CPU task groups 370. The CPU task groups 370 includes a first task group 372 that includes applications M1 310 and M2 320. The CPU task groups 370 also includes a second task group 374 that includes applications M1 318 and M2 304. This is consistent with the operations of the CPU grouping module 106 previously discussed with reference to FIG. 1, since the first task group 372 is associated with a total processing cost of 30 (e.g., according to the processing cost data 340), and the second task group 374 is also associated with a total processing cost of 30.

The first task group 372 may be pulled from the CPU processing queue 202 by a first thread from the CPU thread pool 206 of FIG. 2. The second task group 374 may be pulled from the CPU processing queue 202 by a second thread from the CPU thread pool 206. According to a particular embodiment, the first thread may provide the first task group 372 to a first CPU of CPUs 130, and the second thread may provide the second task group 374 to a second CPU of CPUs 130 that is different than the first CPU. In another embodiment, the first thread may provide the first task group 372 to a first CPU core of a CPU, and the second thread may provide the second task group 374 to a second CPU core of the CPU that is different than the first CPU core.

Further, as depicted in FIG. 3B, the GPU batching module 108 groups the applications included in the GPU processing queue 204 into GPU batches 380. The GPU batches 380 include a first batch 382 that includes applications M3 306 and M3 314. The GPU batches 308 also include a second batch 384 that includes applications M4 308, M4 316, and M4 324. This is consistent with the operations of the GPU batching module 108 previously discussed with reference to FIG. 1 since the first batch 382 and the second batch 384 each include only applications of the same application identifier.

The first batch 382 may be pulled from the GPU processing queue 204 by a first thread of the GPU thread pool 208 of FIG. 2. The second batch 384 may be pulled from the GPU processing queue 204 by a second thread of the GPU thread pool 208. As such, the first thread may provide the first batch 382 to GPU 210C to be processed, and the second thread may provide the second batch 384 to GPU 210A for processing.

It will be appreciated that the scheduling scenario depicted in FIG. 3A-B is merely an example. Other scenarios can have a greater or fewer number of requests and/or a greater or fewer number of applications associated with the requests. Further, other scenarios can have a greater or fewer number of CPU task groups 370 and GPU batches 380, respectively. Further still, application identifiers may differ, and their respective CPU processing costs and GPU processing costs stored by the processing cost data 340 may also be different.

Figure 4:
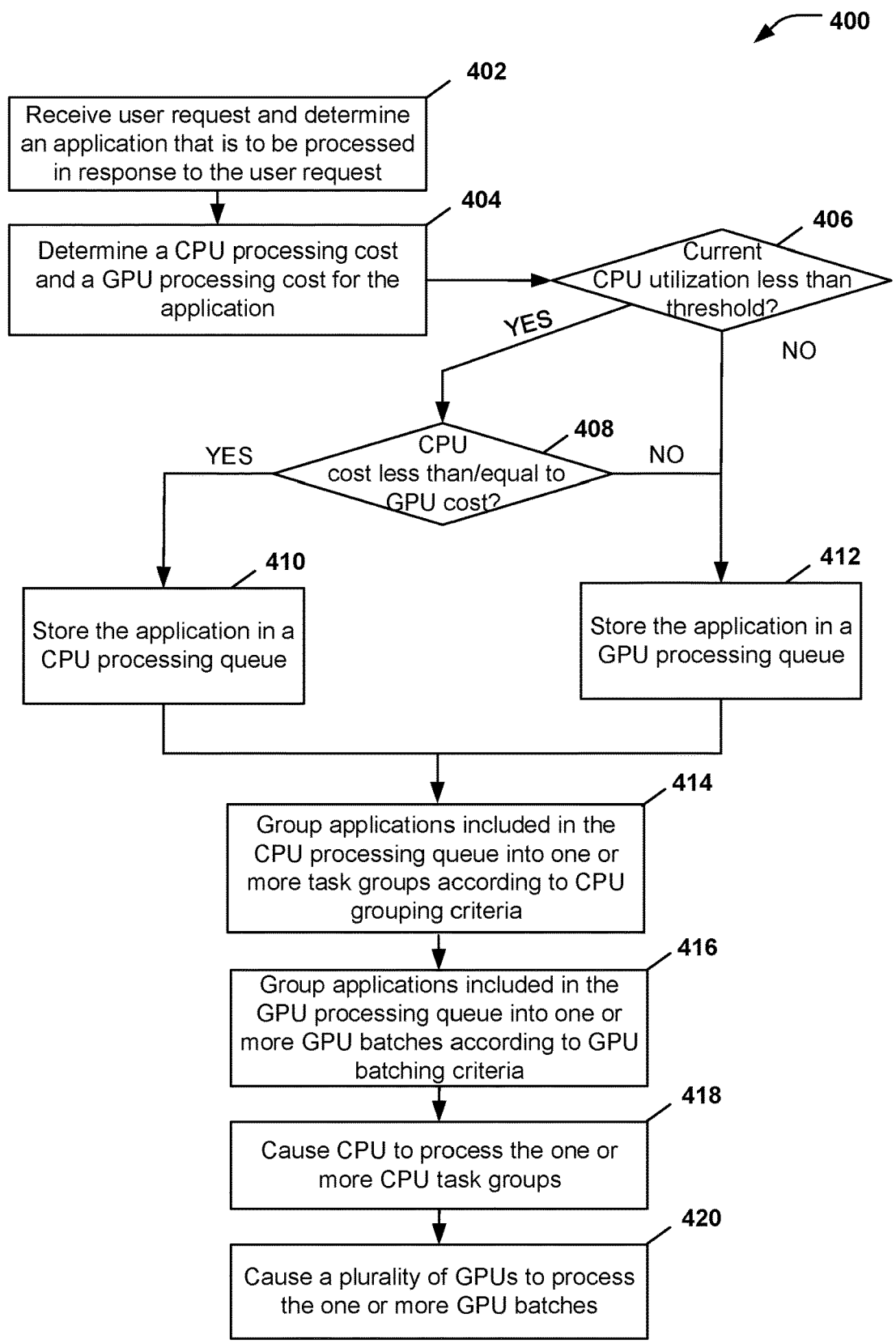
FIG. 4 illustrates a flow diagram illustrating a method for scheduling applications in a CPU and GPU hybrid environment, according to some embodiments

FIG. 4 illustrates an example flow diagram of a method 400 for scheduling applications in a CPU and GPU hybrid environment, according to one or more particular embodiments. The method begins at step 402, where a service provider server, such as server provider server 102 receives a user request and determines an application (e.g., from the set of applications 110) that is to be processed in response to the user request.

At step 404, the service provider server determines a CPU processing cost and a GPU processing cost for the application. At step 406, the service provider server determines whether a current CPU utilization of a CPU (e.g., from the CPUs 130) is less than a utilization threshold. If not, the method proceeds to step 412, where the service provider server stores the application in a GPU processing queue (e.g., GPU processing queue 204).

If the current CPU utilization is indeed less than a utilization threshold, the method 400 proceeds to step 408, where the service provider server determines whether the CPU processing cost is less than or equal to the GPU processing cost. If so, the method 400 proceeds to step 410, where the service provider server stores the application in a CPU processing queue (e.g., CPU processing queue 202). If not, the method 400 proceeds to step 412, where the service provider server stores the application in the GPU processing queue.

From either step 410 or step 412, the method 400 proceeds to step 414, where the service provider server groups the set of applications included in the CPU processing queue into one or more task groups according to CPU grouping criteria. At step 416, the service provider server groups the set of applications included in the GPU processing queue into one or more GPU batches according to GPU batching criteria.

At step 418, the service provider server causes a CPU(s) or CPU core(s) to process the one or more CPU task groups. At step 420, the service provider server causes at least one GPU of a plurality of GPUs to process the one or more GPU batches.

Figure 5:
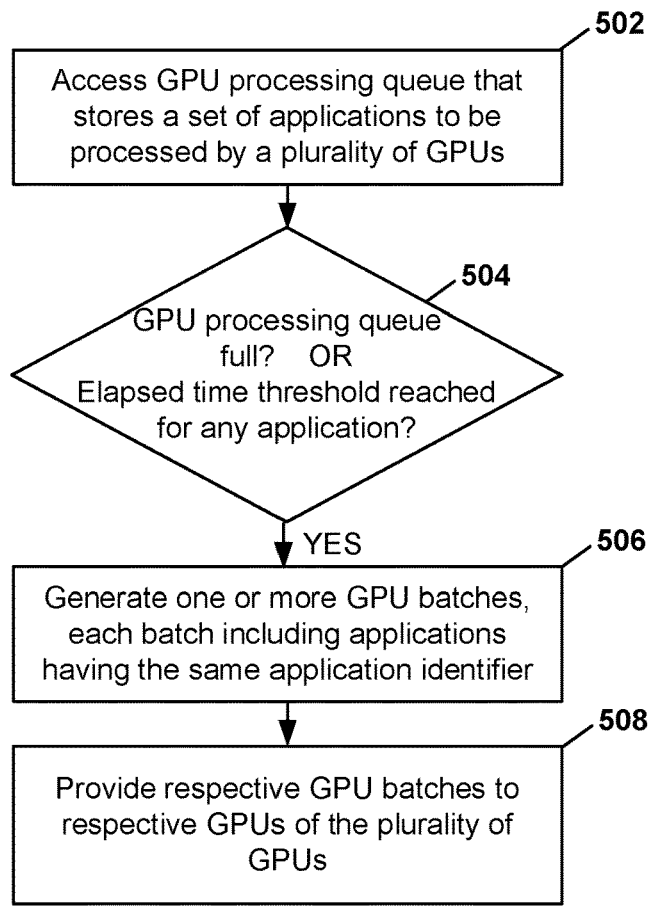
FIG. 5 illustrates a flow diagram illustrating a method for grouping applications into one or more GPU batches, according to some embodiments.

Referring now to FIG. 5 a flow diagram is depicted of a method 500 for grouping applications into one or more GPU batches, according to an embodiment. The method 500 begins at step 502, where a batching module (e.g., GPU batching module 108) is configured to access a GPU processing queue (e.g., GPU processing queue 204) that stores a set of applications (e.g., applications 110) to be processed by a plurality of GPUs.

At step 504, the batching module determines whether the GPU processing queue is full (e.g., the number applications stored in the queue has reached maximum capacity) or whether an elapsed time threshold as been reached for any of the applications in the set of applications stored in the GPU processing queue. If either of the above conditions are true, the method 500 proceeds to step 508, where the batching module generates one or more GPU batches, with each GPU batch including only applications that have the same identifier. At step 508, the batching module provides the respective GPU batches of the one or more GPU batches to the plurality of GPUs to be processed.

Example Computing Device

Figure 6:
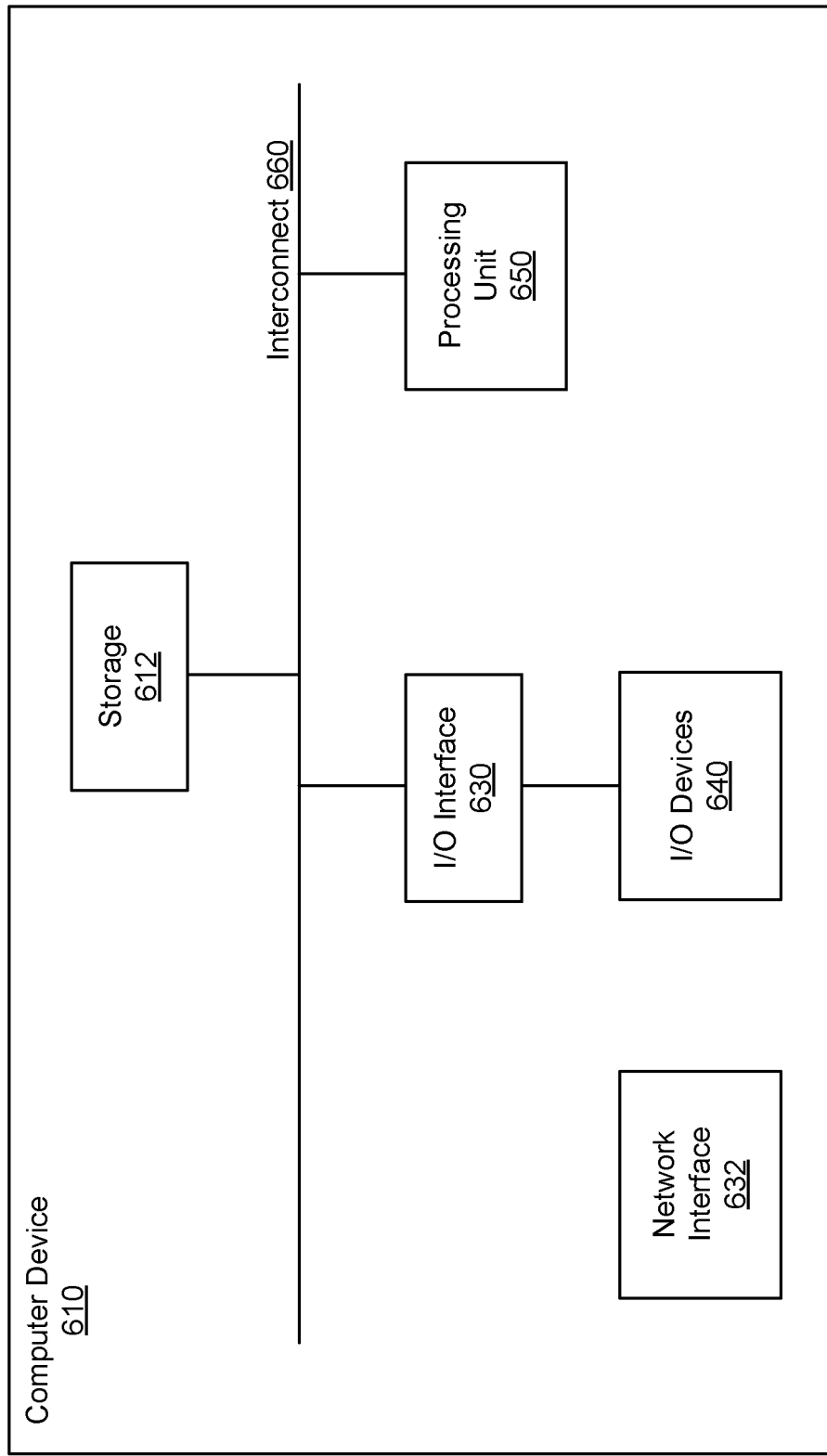
FIG. 6 is a block diagram illustrating an exemplary computing device, according to some embodiments.

Turning now to FIG. 6, a block diagram of one embodiment of computing device (which may also be referred to as a computing system) 610 is depicted. Computing device 610 may be used to implement various portions of this disclosure including the components illustrated in FIG. 1. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
    a plurality of central processing units (CPUs), each of the plurality of CPUs having a plurality of CPU cores;
    a plurality of graphical processing units (GPUs);
    a non-transitory memory storing computer-executable instructions; and
    one or more hardware processors coupled to the non-transitory memory and configured to execute the computer-executable instructions to cause the system to perform operations comprising:
        receiving a request to process one or more applications;
        for each application in the one or more applications:
            determining a respective CPU cost corresponding to processing of the application by one of the plurality of CPUs and a respective GPU cost corresponding to processing of the application by one of the plurality of GPUs; and based on comparing the respective CPU cost and the respective GPU cost, determining whether to store the application in a first processing queue associated with the plurality of CPUs or in a second processing queue associated with the plurality of GPUs;

grouping a first set of applications stored in the first processing queue into one or more CPU task groups, wherein the grouping the first set of applications minimizes a difference between a first total processing cost of a first task group of the one or more CPU task groups and a second total processing cost of a second task group of the one or more CPU task groups;

causing the plurality of CPUs to process the one or more CPU task groups;

grouping a second set of applications stored in the second processing queue into one or more GPU batches according to GPU batching criteria; and causing the plurality of GPUs to process the one or more GPU batches.

2. The system of claim 1, wherein the respective CPU cost corresponds to a first amount of time associated with processing the application by one of the plurality of CPUs, wherein the respective GPU cost corresponds to a second amount of time associated with processing the application by one of the plurality of GPUs, and wherein the operations further comprise:

receiving information related to an actual processing cost of the processing of the application; and adjusting one or more of the respective CPU cost or the respective GPU cost based on the information related to the actual processing cost.

3. The system of claim 1, wherein the determining whether to store the application in the first processing queue or in the second processing queue further comprises:

determining a first CPU cost and a first GPU cost associated with a first application of the one or more applications; and in response to determining that the first CPU cost is less than the first GPU cost, storing the first application in the first processing queue.

4. The system of claim 1, wherein the determining whether to store the application in the first processing queue or in the second processing queue further comprises:

determining a first CPU cost and a first GPU cost associated with a first application of the one or more applications; and in response to determining that the first GPU cost is less than the first CPU cost, storing the first application in the second processing queue.

5. The system of claim 1, wherein the first processing queue includes applications that were previously assigned to the first processing queue based on one or more previous requests.

6. The system of claim 1, wherein the second processing queue includes applications that were previously assigned to the second processing queue based on one or more previous requests.

7. The system of claim 1, wherein the grouping the first set of applications into the one or more CPU task groups further comprises:

determining a number of threads included in the first processing queue; and dividing the number of threads by a number of CPUs in the plurality of CPUs.

8. The system of claim 1, wherein the grouping the second set of applications according to the GPU batching criteria further comprises:

determining that first applications from the second set of applications are of a first application type;

grouping the first applications into a first GPU batch of the one or more GPU batches;

determining that second applications from the second set of applications are of a second application type that is different from the first application type; and grouping the second applications into a second GPU batch of the one or more GPU batches.

9. The system of claim 8, wherein the causing the plurality of GPUs to process the one or more GPU batches further comprises:

causing a first GPU of the plurality of GPUs to process a first GPU batch of the one or more GPU batches; and causing a second GPU of the plurality of GPUs to process a second GPU batch of the one or more GPU batches, the first GPU being different from the second GPU.

10. A method, comprising:

assigning, by a system comprising one or more hardware processors, a first application to a central processing unit (CPU) processing queue based on a first CPU processing cost corresponding to a first application identifier of the first application being less than a first graphical processing unit (GPU) processing cost corresponding to the first application identifier;

assigning, by the system, a second application to a GPU processing queue based on a second GPU processing cost corresponding to a second application identifier of the second application being less than a second CPU processing cost corresponding to the second application identifier;

grouping, by the system, a first set of applications assigned to the CPU processing queue into one or more CPU task groups, wherein the grouping minimizes a difference between a first total processing cost of a first task group of the one or more CPU task groups and a second total processing cost of a second task group of the one or more CPU task groups;

grouping, by the system, the second application with a third application assigned to the GPU processing queue in a batch based on determining that the second application identifier matches a third application identifier associated with the third application;

causing, by the system, a first GPU of a plurality of GPUs to process the batch; and in response to determining an amount of time for the first GPU to process the batch, determining, by the system, whether to adjust the second GPU processing cost corresponding to the second application identifier.

11. The method of claim 10, wherein the second GPU processing cost includes a previously determined amount of time taken for at least one of the plurality of GPUs to process data of an application associated with the second application identifier.

12. The method of claim 11, wherein the determining whether to adjust the second GPU processing cost further comprises:

determining whether the amount of time for the first GPU to process the batch is different from the previously determined amount of time.

13. The method of claim 10, further comprising:
causing a CPU to process first data associated with the first application; and
in response to determining a second amount of time for the CPU to process the first data, determining whether to adjusting the first CPU processing cost corresponding to the first application identifier.

14. The method of claim 13, wherein the first CPU processing cost includes a second previously determined amount of time taken for the CPU to process data of an application associated with the first application identifier, wherein the determining whether to adjust the first CPU processing cost the comprises:
determining whether the second amount of time is different from the second previously determined amount of time.

15. The method of claim 10, wherein the first application corresponds to a first neural network model, and the second application corresponds to a second neural network model.

16. The method of claim 10, wherein the batch is generated in response to determining a number of applications in the GPU processing queue exceeds a maximum number of applications associated with the GPU processing queue.

17. A non-transitory machine-readable medium having stored thereon machine-readable instructions executable to cause a machine to perform operations comprising:
receiving instructions to process a first application in response to a user request;
determining whether to store the first application in a first processing queue or a second processing queue based on a comparison between a central processing unit (CPU) processing cost associated with the first application and a graphical processing unit (GPU) processing cost associated with the first application;
grouping a first set of applications stored in the first processing queue into one or more CPU task groups, wherein the grouping the first set of applications minimizes a difference between a first total processing cost of a first task group of the one or more CPU task groups and a second total processing cost of a second task group of the one or more CPU task groups;
grouping a second set of applications stored in the second processing queue into one or more GPU batches according to GPU batching criteria; and
causing a plurality of CPUs to process the one or more task groups and a plurality of GPUs to process the one or more GPU batches.

18. The non-transitory machine-readable medium of claim 17, wherein each GPU batch in the one or more GPU batches is processed by a different GPU of the plurality of GPUs.

19. The non-transitory machine-readable medium of claim 17, wherein the operations further comprise:
in response to determining, based on the comparison, that the CPU processing cost is less than or equal to the GPU processing cost, storing the first application in the first processing queue, wherein the first set of applications includes the first application.

20. The non-transitory machine-readable medium of claim 17, wherein the operations further comprise:
in response to determining, based on the comparison, that the GPU processing cost is less than the CPU processing cost, storing the first application in the second processing queue, wherein the second set of applications includes the first application.

* * * * *